US010654493B2

(12) United States Patent
Badigannavar

(10) Patent No.: US 10,654,493 B2
(45) Date of Patent: May 19, 2020

(54) INTERVEHICLE COMMUNICATION AND NOTIFICATION

(71) Applicant: eBay, Inc., San Jose, CA (US)

(72) Inventor: Vijet Siddalinga Badigannavar, Boston, MA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 16/166,956

(22) Filed: Oct. 22, 2018

(65) Prior Publication Data

US 2020/0122743 A1  Apr. 23, 2020

(51) Int. Cl.
| | |
|---|---|
| *B60W 50/16* | (2020.01) |
| *H04W 4/46* | (2018.01) |
| *H04W 76/14* | (2018.01) |
| *G07C 5/00* | (2006.01) |
| *B60W 50/14* | (2020.01) |

(52) U.S. Cl.
CPC ............ *B60W 50/16* (2013.01); *G07C 5/008* (2013.01); *H04W 4/46* (2018.02); *H04W 76/14* (2018.02); *B60W 2050/146* (2013.01); *B60W 2420/52* (2013.01); *B60W 2420/54* (2013.01); *B60W 2550/308* (2013.01); *B60W 2750/40* (2013.01)

(58) Field of Classification Search
CPC ............ B60W 50/16; B60W 2750/40; B60W 2420/52; B60W 2550/308; B60W 2050/146; B60W 2420/54; G07C 5/008; H04W 4/46; H04W 76/14
USPC ........................................................ 340/902
See application file for complete search history.

(56) References Cited

U.S. PATENT DOCUMENTS

| | | | |
|---|---|---|---|
| 8,538,627 B2 | 9/2013 | Asahara et al. | |
| 9,648,107 B1 * | 5/2017 | Penilla | H04L 67/12 |
| 9,749,811 B2 * | 8/2017 | Tosa | G08G 1/096791 |
| 10,019,901 B1 * | 7/2018 | Fields | G08G 1/07 |
| 10,026,309 B1 * | 7/2018 | Nepomuceno | G08G 1/01 |
| 2004/0036580 A1 | 2/2004 | Michelson | |
| 2007/0252723 A1 * | 11/2007 | Boss | G08G 1/162 340/902 |

(Continued)

FOREIGN PATENT DOCUMENTS

| | | |
|---|---|---|
| EP | 2798863 A1 | 11/2014 |
| WO | 2003/001474 A2 | 1/2003 |

(Continued)

OTHER PUBLICATIONS

Non-Final Office Action received for U.S. Appl. No. 16/216,816, dated Jul. 10, 2019, 13 pages.

(Continued)

*Primary Examiner* — Hirdepal Singh
(74) *Attorney, Agent, or Firm* — Shook, Hardy & Bacon L.L.P.

(57) ABSTRACT

Technologies are shown for intervehicle communication involving notification messages sent from one vehicle to another vehicle. Sensor event data from one vehicle can be sent in a wireless message to another vehicle and information from the wireless message displayed to a driver of the other vehicle providing the driver with information that may not be detectable by the sensors in the driver's vehicle. Inquiries or requests can also be sent from one vehicle to another vehicle. User interfaces can include graphical user interfaces, haptic devices and audio devices.

17 Claims, 13 Drawing Sheets

(56) References Cited

U.S. PATENT DOCUMENTS

| | | | |
|---|---|---|---|
| 2014/0062724 A1* | 3/2014 | Varoglu | G08G 1/163 340/902 |
| 2014/0118167 A1 | 5/2014 | Im et al. | |
| 2014/0200760 A1* | 7/2014 | Kaufmann | G07C 5/008 701/29.3 |
| 2015/0200957 A1 | 7/2015 | Zhang et al. | |
| 2017/0053534 A1* | 2/2017 | Lokesh | B60W 30/165 |
| 2017/0113686 A1* | 4/2017 | Horita | B60W 30/12 |
| 2017/0120906 A1* | 5/2017 | Penilla | G05D 1/0011 |
| 2017/0197617 A1 | 7/2017 | Penilla et al. | |
| 2017/0268896 A1 | 9/2017 | Bai et al. | |
| 2017/0337571 A1* | 11/2017 | Bansal | G07C 5/008 |
| 2018/0037227 A1* | 2/2018 | D'sa | B60W 50/04 |
| 2018/0113450 A1* | 4/2018 | Sherony | G08G 1/167 |
| 2018/0132193 A1* | 5/2018 | Misener | H04W 52/281 |
| 2018/0174462 A1* | 6/2018 | Um | B60W 50/0097 |
| 2018/0354419 A1* | 12/2018 | Choi | B60R 1/00 |
| 2019/0012908 A1* | 1/2019 | Chun | H04N 7/04 |
| 2019/0023281 A1* | 1/2019 | Fukutaka | B60W 20/11 |
| 2019/0122543 A1* | 4/2019 | Matus | G08G 1/0133 |
| 2019/0139411 A1* | 5/2019 | Dhull | G09F 19/18 |

FOREIGN PATENT DOCUMENTS

| | | |
|---|---|---|
| WO | 2011/044723 A1 | 4/2011 |
| WO | 2013/101183 A1 | 7/2013 |

OTHER PUBLICATIONS

Final Office Action received for U.S. Appl. No. 16/216,816, dated Dec. 23, 2019, 15 pages.
Response to Non-Final Office Action filed on Oct. 10, 2019, for U.S. Appl. No. 16/216,816, dated Jul. 10, 2019, 18 pages.
International Search Report received for PCT Patent Application No. PCT/US2019/041999, dated Nov. 21, 2019, 4 pages.
International Written Opinion received for PCT Patent Application No. PCT/US2019/041999, dated Nov. 21, 2019, 15 pages.

* cited by examiner

INTERVEHICLE COMMUNICATION AND NOTIFICATION

BACKGROUND

Currently, automobiles often feature communication equipment and sensor equipment. The communication equipment typically provides for linking with an operator's telephone or other mobile device as well as internet communications and telecommunications. However, the communication equipment does not generally provide for direct communications between vehicles.

Increasingly sophisticated sensor equipment, such as radar, camera or LIDAR systems, provide for collision detection that notifies an operator when the automobile is approaching an object, e.g. another vehicle, an object or a lane marker. However, the sensor equipment is limited to detecting objects within sensory range, which is typically limited to the immediate or close proximity of the automobile.

It is with respect to these and other considerations that the disclosure made herein is presented.

SUMMARY

The disclosed technology is directed towards providing communications between vehicles that enables information, such as notifications, messages and sensor data, to be shared between vehicles.

In certain simplified examples of the disclosed technologies, a method, system or computer readable medium for intervehicle communication involve receiving a notification of a first vehicle event within a first vehicle, converting the first vehicle event into a first wireless notification, automatically determining one or more remote receiving devices to receive the first wireless notification based on a type of the first vehicle event and proximity of the one or more remote receiving devices to the first vehicle, and sending the first wireless notification to the one or more remote receiving devices. These examples also involve receiving a second wireless notification from another device located in a second vehicle, converting the second wireless notification to a second vehicle event, automatically determining the second vehicle is within a proximity to the first vehicle, and displaying a representation of the second vehicle event on a user interface within the first vehicle, the second vehicle event superimposed on a representation of the second vehicle on the user interface.

Some examples involve, in response to determining the second wireless notification is a general alert, initiating a haptic vibration in response to the second wireless notification. In some examples, the second wireless notification indicates at least one of a braking action, a turning action, an acceleration action, a door opening action, or historical driving pattern action of the second vehicle and the representation of the second vehicle event indicates that the second vehicle event is the braking action, the turning action, the acceleration action, the door opening action, or the historical driving pattern. In some other examples, the second wireless notification indicates at least one of a position, distance, speed or direction of the second vehicle and the representation of the second vehicle event indicates the position, distance, speed or direction of the second vehicle.

In other examples, automatically determining one or more remote receiving devices to receive the first wireless notification based on a type of the vehicle event and proximity of the one or more remote receiving devices to the first vehicle further comprises determining a strength of network signal between the first vehicle and the second vehicle. In still other examples, automatically determining one or more remote receiving devices to receive the first wireless notification based on a type of the vehicle event and proximity of the one or more remote receiving devices to the first vehicle further comprises receiving an ultrasonic sensor result or a lidar sensor result.

In yet other examples, the second wireless notification includes a request for information by the first vehicle to the second vehicle. In additional examples, the request for information includes a request for information about a location recently visited by the second vehicle, such as a museum, music venue, retail location, gas pump, or restaurant.

In further examples, the user interface in the first vehicle includes a map and the second vehicle is superimposed on the map. In other examples, the second vehicle is a bicycle and the user interface in the first vehicle depicts a bicycle.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
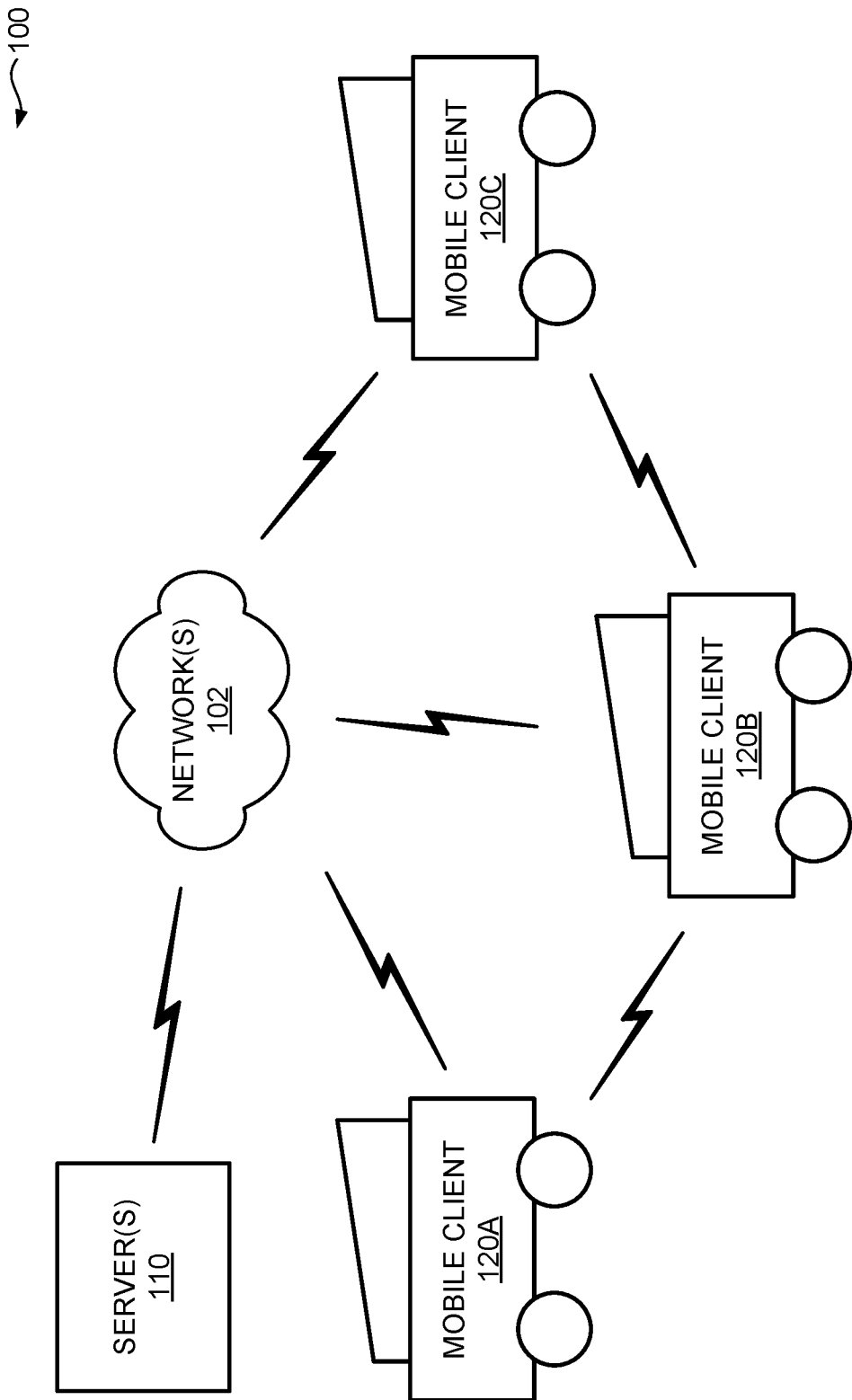
FIG. 1A is an architectural diagram showing an illustrative example of an architecture suitable for application of the disclosed technology for intervehicle communication.

The following Detailed Description describes technologies for communicating information, such as sensor inputs detected in one vehicle to another vehicle, for display to a driver of a vehicle. While the sensor information conventionally available to a vehicle operator is limited to the data that the vehicle's sensors can collect, the disclosed technology provides for sensor data to be received from another vehicle and displayed to the driver.

In certain simplified examples of the disclosed technologies, a method, system or computer readable medium for driver input actions in one vehicle, such as braking, turning, accelerating or door opening, can be communicated to another vehicle and displayed to the driver of the other vehicle.

In other examples, proximity sensor data in one vehicle, such as radar, LIDAR, or optical sensor data, can be communication to another vehicle. As a result, the driver of the other vehicle can receive information regarding objects that may not be detectable by the sensors of the driver's vehicle, but that are detectable by the sensors of a nearby vehicle. For example, information regarding an obstacle detected by a vehicle in front of the driver's vehicle can be communicated and displayed to the driver in the driver's vehicle. In another example, a first vehicle can receive sensor information, such as position, speed, or direction, from a second vehicle regarding a third vehicle that the driver and sensors of the first vehicle are unable to see or detect.

In still other examples, messages or inquiries from one vehicle can be communicated to another vehicle. For example, a driver of one vehicle can query another vehicle to ask whether the driver of the other vehicle is leaving. In another example, one vehicle can send a query to another vehicle to obtain an amount of parking space that the other vehicle's sensors can detect. In yet another example, one vehicle can send a request to one or more other vehicles with autonomous driving capability to request that the other vehicle or vehicles move to provide additional parking space.

In yet other examples, information from a static object, such as a building, traffic signal, pedestrian crossing, or a bridge, can be communicated to a vehicle and displayed to a driver of the vehicle. For example, a notification that a traffic signal is about to turn red or a bridge is about to be raised can be transmitted to the vehicle and displayed to the driver. In another example, a notification that a vehicle or a pedestrian is exiting a building can be transmitted to the vehicle for display to the driver. In other examples, information regarding an event involving a building, such as ticket information regarding a game at a sports arena or a sale at a store, can be transmitted from the building to the vehicle for display to the driver. In still other examples, advertising, promotion or similar information involving a product or service can be displayed to the driver when the vehicle is in a vicinity to a location associated with the product or service. In still another example, if a driver of first vehicle is offering an object, e.g. an on-line auction of the object, and a driver of a second vehicle has indicated an interest in the object, e.g. has submitted a bid on the object or is tracking the object, then a notification can be displayed to one or both drivers when their vehicles are within a proximity to one another.

Information can be displayed to the driver in several ways. For example, a graphical user interface (GUI) in one vehicle can be used to display the relative position of another vehicle. Speed and direction information of the other vehicle can also be displayed on the GUI. Notifications regarding driver actions in other vehicles can be displayed on the GUI. Information and notifications regarding static objects can be displayed on the GUI. The GUI can include a dashboard, a head-up display shown on a windshield or in vehicle mirrors.

In additional examples, information and notifications can be displayed to a driver through haptic or audio outputs. For example, any object that is in contact with the driver, such as a driver's seat, armrest, brake pedal, or steering wheel, can be equipped with haptic devices to notify a driver using vibration signals. In some examples, a seat is provided with multiple haptic devices that are differentially activated to convey a relative position of a notification, e.g. activating the haptic devices adjacent to a driver's left shoulder to indicate an object near the vehicle's left, rear bumper.

In certain implementations, different haptic signal patterns can be utilized to indicate different notifications, such as a pulsed vibration for an emergency vehicle notification or a continuous vibration for an adjacent vehicle notification. In yet other example, a locus of the output of the haptic devices can be shifted to provide a moving perception of the notification to the driver, e.g. the perceived position of the vibration tracks the movement of a detected vehicle.

In another example, a vehicle's audio system can be utilized to notify a driver using audio signals. In some examples, multiple speakers in a vehicle's audio system are differentially activated to convey a relative position of a notification, e.g. outputting an audio signal with a higher amplitude for right-side and particularly right-rear side speakers to indicate an object near the vehicle's right, rear bumper.

In certain examples, different audio signals can be utilized to indicate different notifications, such as a spoken audio message for an emergency vehicle notification or a particular audio tone for an adjacent vehicle notification. In yet other example, a locus of the output of the speakers can be shifted to provide a moving perception of the notification to the driver, e.g. the perceived position of the audio signal tracks the movement of a detected vehicle.

Another example of vehicle communication in the disclosed technology involves detecting a first sensor input event in a first vehicle, generating a first wireless notification message based on the first sensor input event, establishing a wireless communication link between the first vehicle and a second vehicle, and transmitting the first wireless notification message from the first vehicle to the second vehicle.

In certain implementations, the disclosed technology involves receiving the first wireless notification message in the second vehicle, and generating an interface signal based on the first wireless notification message that is configured to cause information from the first wireless notification message to be displayed on a user interface of the second vehicle. In some of these implementations, the first sensor input event comprises at least one of a braking action, a steering action, an acceleration action, a door opening action, or a potential action relating to a historical driving pattern and the signal configured to cause the information to be displayed on the user interface of the second vehicle comprises information corresponding to at least one of the braking action, the steering action, the acceleration action, the door opening action, or a potential action relating to the historical driving pattern.

For some aspects of this example of the disclosed technology, the operation of establishing a wireless communication link between the first vehicle and a second vehicle involves automatically determining one or more vehicle communication devices within a proximity to the first vehicle, detecting that a vehicle communication device of the second vehicle is within the proximity to the first vehicle, and establishing the communication link between the vehicle communication device of the first vehicle and the vehicle communication device of the second vehicle.

In other aspects of this example, the operation of establishing a wireless communication link between the first vehicle and a second vehicle involves determining a strength of network signal between the first vehicle and the second vehicle. In still other aspects of this example, the first wireless notification message includes information regarding at least one of a position, speed, and direction of the first vehicle.

In yet another aspect of this example, the first wireless notification message includes information from one or more sensors in the first vehicle regarding at least one of a third vehicle and an object. The information from the one or more sensors in the first vehicle in the first wireless notification message can include information regarding at least one of a distance, position, speed, and direction of the third vehicle or the object.

Yet another example of computer-implemented vehicle communication method involves establishing a wireless communication link between a first vehicle and a second vehicle, receiving a first wireless message in the first vehicle from the second vehicle, where the first wireless message is based on a first sensor input event in the second vehicle, and generating an interface signal with information based on the first wireless message that is configured to cause the information to be displayed by a user interface of the first vehicle.

In some aspects of this example, the first sensor input event can be one or more of a braking action, a steering action, an acceleration action, or a door opening action, and the signal that is configured to cause the information to be displayed on the user interface of the first vehicle includes information corresponding the braking action, the steering action, the acceleration action or the door opening action of the first sensor input event.

In other aspects of this example, the first sensor input event can include one or more of a position, direction or speed of a third vehicle and the signal configured to cause the information to be displayed on the user interface of the first vehicle includes information corresponding to the position, direction or speed of the third vehicle. Examples of the user interface include a graphical user interface, a head-up display user interface, a haptic user interface, and an audio user interface.

Yet another aspect of this example involves establishing a wireless communication link between the first vehicle and a static object, receiving a second wireless message in the first vehicle from the static object, the second wireless message including information regarding the static object, and generating an interface signal with the information in the second wireless message that is configured to cause the information in the second wireless message to be displayed by a user interface of the first vehicle.

The information in the second wireless message regarding the static object can include event information for an event to be held at the static object, historical information regarding the static object, notification that a vehicle or person is entering or exiting the static object, and information regarding status, goods or services at the static object.

In one aspect of the disclosed technology can include transmitting a third wireless message from the first vehicle to the second vehicle, where the third wireless message includes an inquiry regarding space available for parking, receiving a fourth wireless message in the first vehicle from the second vehicle, where the fourth wireless message includes information regarding the space available for parking, and generating an interface signal with the information in the fourth wireless message that is configured to cause the information regarding the space available for parking in the fourth wireless message to be displayed by a user interface of the first vehicle.

The disclosed technology can further involve transmitting a fifth wireless message from the first vehicle to the second vehicle, where the fifth wireless message includes a request for the second vehicle to move to make space available for parking.

In some implementations, the operation of establishing a wireless communication link between the first vehicle and a second vehicle involves automatically determining one or more vehicle communication devices within a proximity to the first vehicle, detecting that a vehicle communication device of the second vehicle is within the proximity to the first vehicle, and establishing the communication link between the vehicle communication device of the first vehicle and the vehicle communication device of the second vehicle.

Certain implementations involve determining a position of the first vehicle with respect to the second vehicle, and generating an interface signal that is configured to cause the position of the first vehicle with respect to the second vehicle to be displayed by the user interface of the first vehicle. In some examples, the user interface is configured to generate an output signal with a perceived position that corresponds to the position of the first vehicle with respect to the second vehicle. These are simplified examples and many factors may be considered in a system or method for communicating information from one vehicle to another vehicle as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, intervehicle communication is provided that permits information to be shared between vehicles. The shared information can include sensor data from one vehicle that cannot be sensed by another vehicle. The shared information can also include sensor data from one vehicle received in a second vehicle and relayed from the second vehicle to the third vehicle. Other examples of shared information can include driver behavior information, messages, music, or gaming interaction. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for intervehicle communication will be described. As will be described in more detail below with respect to the figures, there are a number of applications and services that may embody the functionality and techniques described herein.

FIG. 1A is an architectural diagram showing an illustrative example of an architecture 100 suitable for application of the disclosed technology for intervehicle communication. In the example of FIG. 1A, mobile clients 120A-C can communicate with network 102. The mobile clients 120A-C can communicate with one another through network 102 as well as servers 110 that can provide information, such as navigation and traffic data. In this example, mobile clients 120A-C are also capable of communicating with one another directly, such as using a wireless hotspot capability in each client. Mobile clients 120 can include smart cars or vehicles and client devices carried by boats, motorcyclists, bicyclists or pedestrians.

Figure 1B:
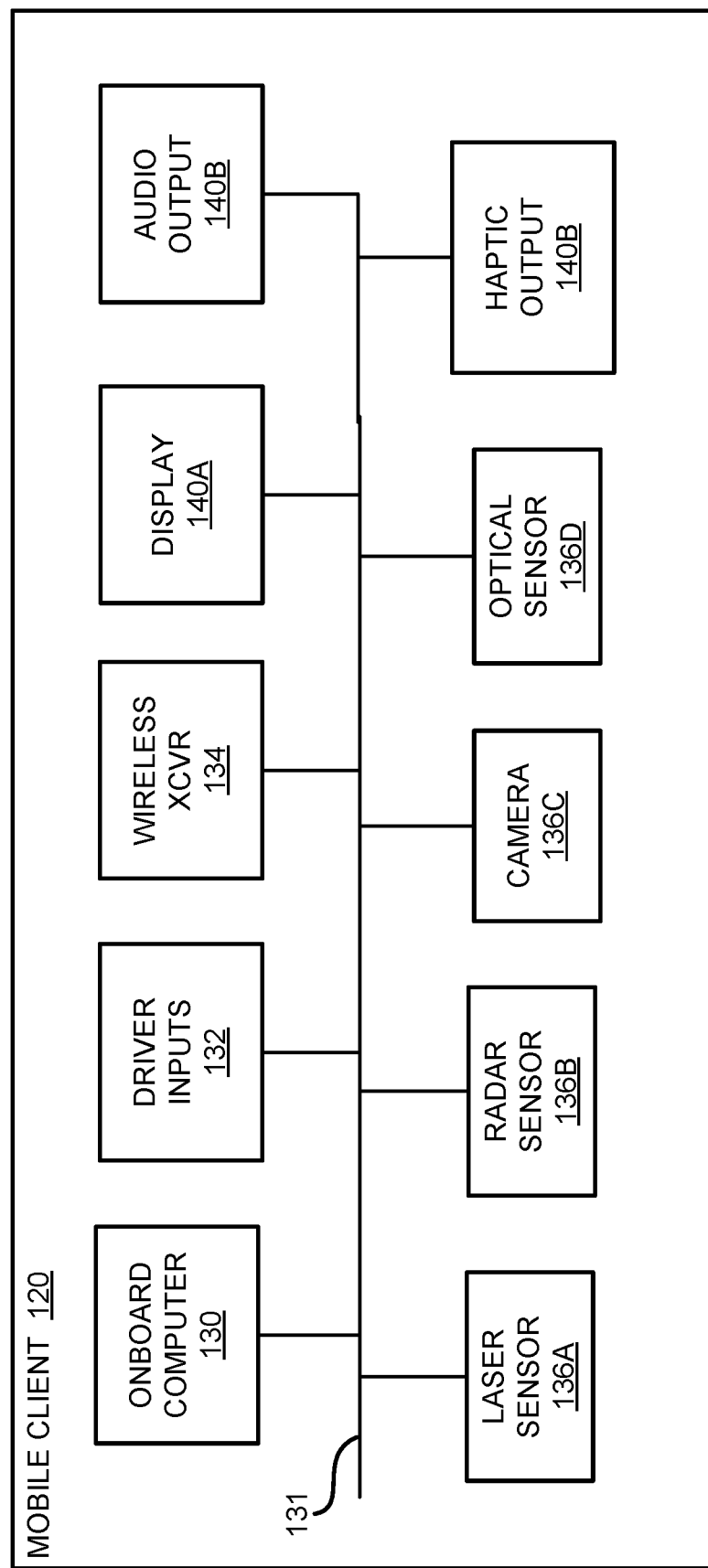
FIG. 1B is an architectural diagram showing an illustrative example of a client architecture for a mobile client suitable for application of the disclosed technology for intervehicle communication.

FIG. 1B is an architectural diagram showing an illustrative example of a client architecture for a mobile client 120 suitable for application of the disclosed technology for intervehicle communication. In this example, mobile client 120 includes an onboard computer 130 that is capable of executing processes for sensing and communication. Onboard computer 130 communicates with a variety of sensors and Input/Output (I/O) devices through a local network or bus 131.

Driver inputs sensor 132 detects driver input actions to a vehicle in which mobile client 120 is installed, such as braking, accelerating, or steering as well as door opening actions or activation of warning flashers. In some implementations, a current speed of a vehicle can also be detected.

Several examples of proximity sensors that are increasingly installed in vehicles are illustrated in the example of FIG. 1B. Laser sensor 136A, e.g. a LIDAR sensor, utilizes a laser beam to detect nearby objects or vehicles. Radar sensor 136B utilizes a microwave beam for detecting objects. Camera 136C captures video or photo data that can be processed to identify objects. Optical sensor 136D utilizes light, such an infrared light, to detect objects. Note that these sensors are generally line-of-sight type sensors that typically cannot detect objects that are obscured by other objects. In other words, the sensors can typically only able to detect an object to which they have an unobstructed path.

Wireless transceiver 134 is a communications device that can be used to send and receive wireless messages, such as event notifications or requests. In the present example, wireless transceiver 134 is a relatively short range communication device, such as a wireless local area network (WLAN) device, that can be used to send or receive messages directly with a wireless transceiver in another vehicle or object. Other short range communications techniques can also be utilized. Signal strength for a communications link between two vehicles can be a factor utilized in determining a proximity between the vehicles.

Several examples of user interface devices that can be installed in vehicles are illustrated in the example of FIG. 1B. Examples for display device 140A can include a graphical user interface (GUI), such as the display illustrated in FIG. 2A, or a head-up display installed in a vehicle as well as other visual output devices, such as collision lights or dashboard indicators. An example of audio output 140B can be a stereo system or other audio speakers in a vehicle. Examples of haptic output 140B can include vibration devices in a driver's seat, arm rest, pedals or steering wheel.

Figure 2B:
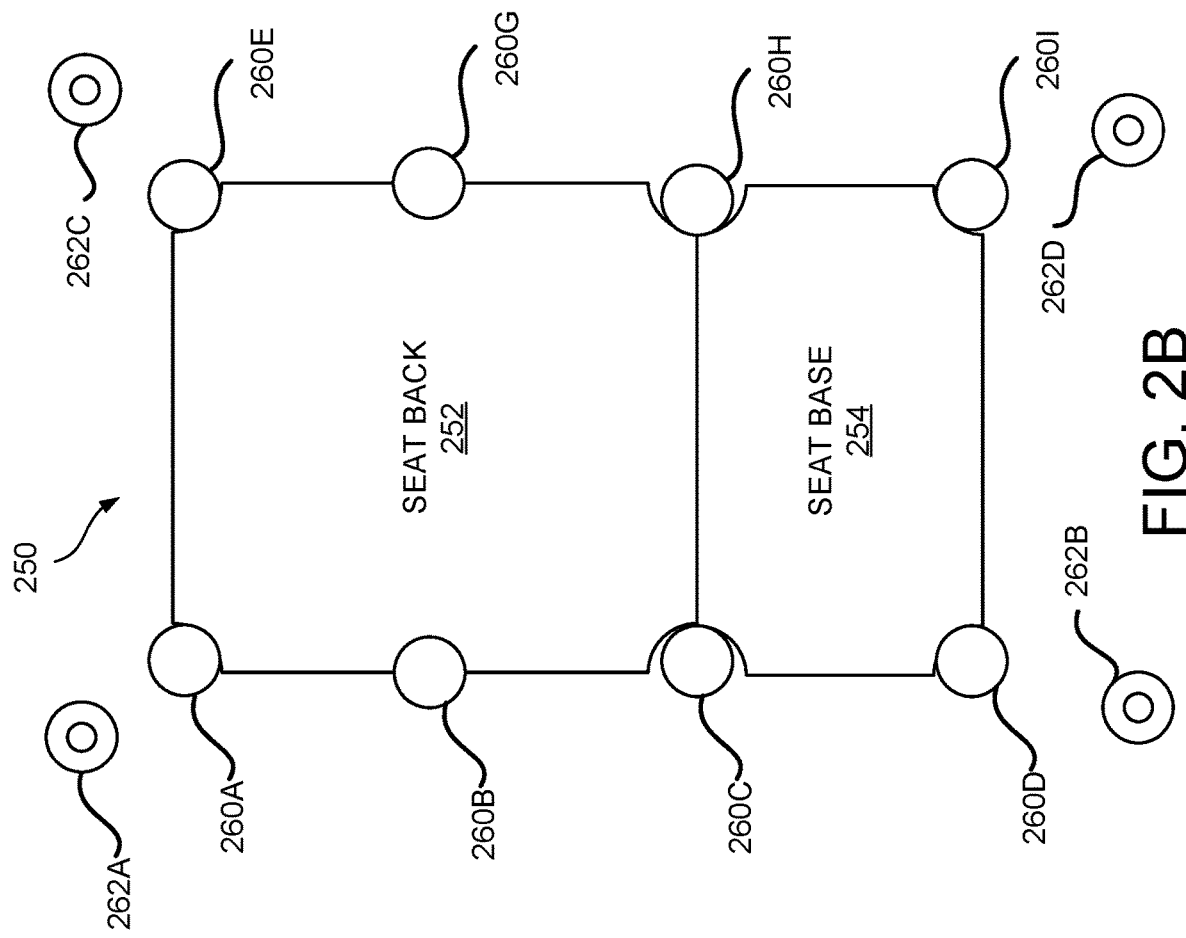
FIG. 2B is a schematic diagram for an example of haptic and audio user interfaces for use in the disclosed technology for intervehicle communication.
Figure 2A:
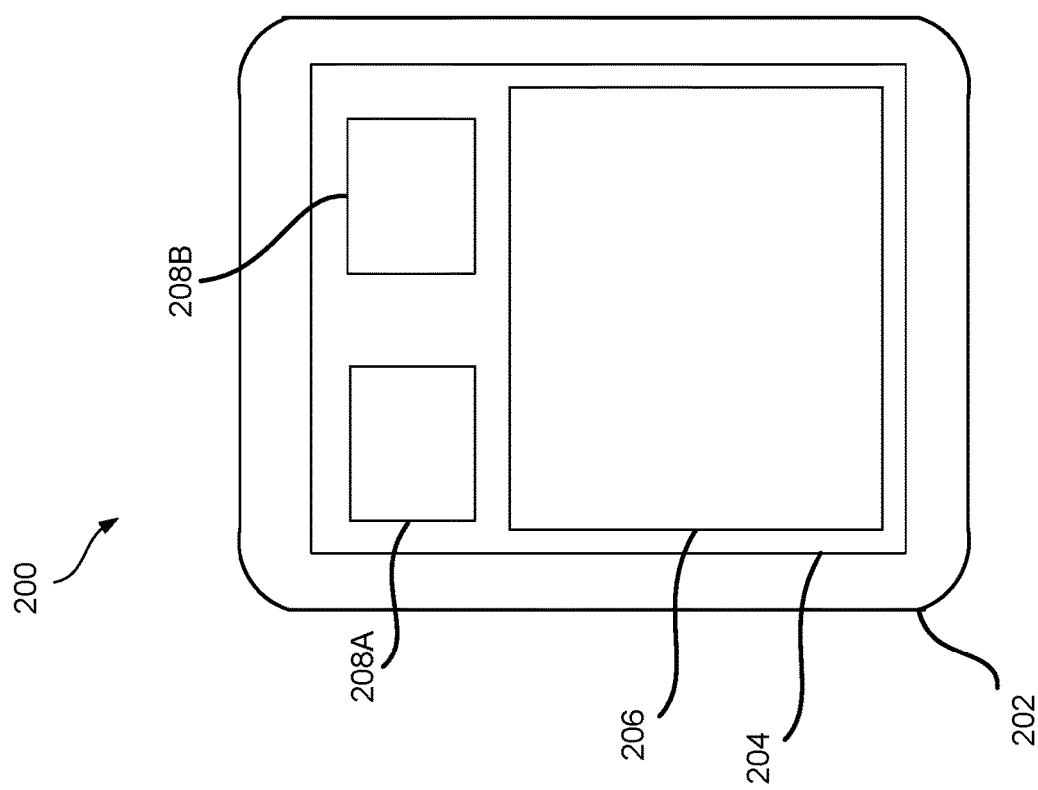
FIG. 2A is a schematic diagram for an example of a graphical user interface for use in the disclosed technology for intervehicle communication.

FIG. 2A is a schematic diagram for an example of a GUI 200 for use in the disclosed technology for intervehicle communication. In this example, GUI 200 includes a chassis 202 with which the GUI is mounted in a vehicle. A display screen 204 can display graphical data and information, such as in display area 206. Display screen 204 can be a touch screen that permits user input from a driver or passenger. In one example, display areas 208A and 208B can be user input zones that a user touches to activate an action, such as a request. In other examples, display areas 208A and 208B can be dedicated status areas or notification areas, such as for displaying a message to the driver.

FIG. 2B is a schematic diagram for an example of a haptic and audio user interface for use in the disclosed technology for intervehicle communication. In this example, a driver's seat 250 with a seat back 252 and seat base 254 is equipped with multiple haptic devices 260A-I disposed at positions along the edge of the back 252 and base 254. In this example, the multiple haptic devices 260A-I can be differentially activated or driven to generate haptic signals representing, for example, a relative position of an object.

For example, an object or vehicle detected adjacent a left rear quarter panel of the vehicle in which seat 250 is installed could result in haptic device 260E being activated to convey the presence and location of the object to the driver. Likewise, an object or vehicle detected adjacent a right front quarter panel of the vehicle in which seat 250 is installed could result in haptic device 260D being activated to convey the presence and location of the object to the driver.

FIG. 2B also illustrates audio speakers 262A-D positioned to provide quadrophonic sound output to a driver. In this example, similar to the haptic devices, speakers 262A-D can be differentially driven to generate audio signals representing a relative position of an object. For example, an object or vehicle detected adjacent a right rear quarter panel of the vehicle could result in speakers 262A-D being driven to produce an audio signal at a perceived position corresponding to a location of the object.

Figure 3A:
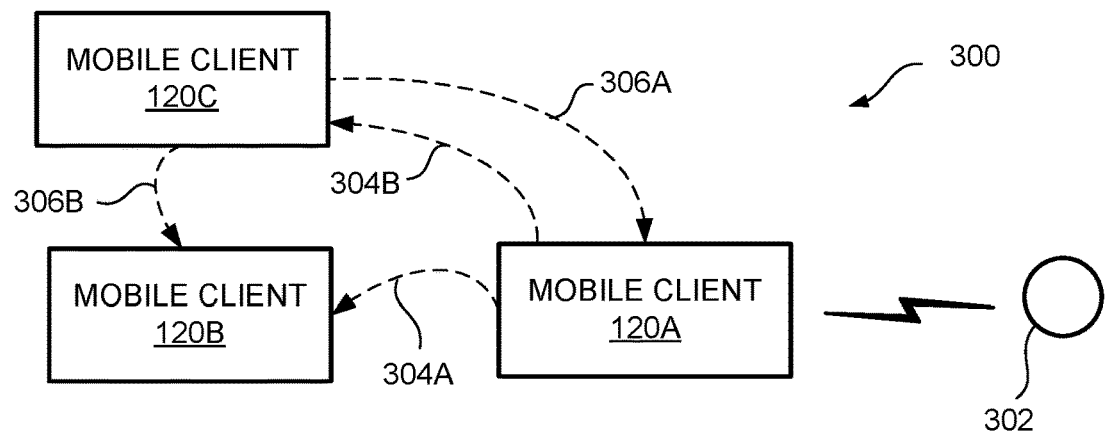
FIG. 3A is a data architecture diagram showing an illustrative example of data exchange in an application of the disclosed technology for intervehicle communication.
Figure 3B:
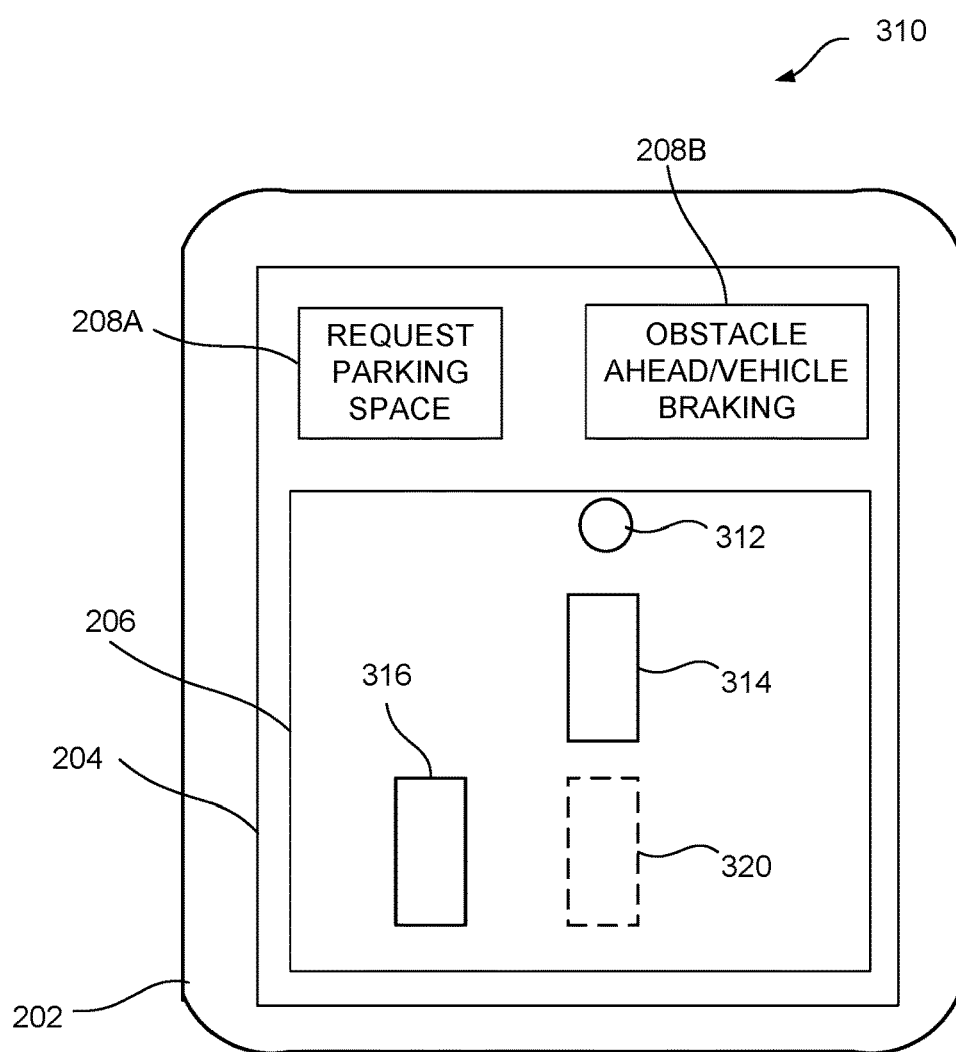
FIG. 3B is a schematic diagram illustrating an example of a graphical user interface in the application of the disclosed technology for intervehicle communication of FIG. 3A.

FIG. 3A is a data architecture diagram showing an illustrative example scenario 300 of data exchange in an application of the disclosed technology for intervehicle communication and FIG. 3B is a schematic diagram illustrating an example of a GUI 310 in mobile client vehicle 120B in the example of FIG. 3A. In scenario 300, sensors in mobile client vehicle 120A detect an object 302 and mobile client vehicle 120A sends message 304A to mobile client vehicle 120B and message 304B to mobile client vehicle 120C with information from the sensor data indicating the presence of obstacle 302.

The information from message 304A is displayed on GUI 310 in mobile client 120B. In this example, mobile client 120B is represented by graphical symbol 320 in display area 206 with mobile client vehicle 120A represented by graphical symbol 314, mobile client vehicle 120C represented by graphical symbol 316, and object 302 represented by graphical symbol 312.

Note that the relative positions of mobile client vehicles 120A-C and object 302 are illustrated in display area 206. Relative position or proximity data can be obtained in a number of ways, such as from sensor data, wireless communication link signal strength, mapping data, and GPS information or a combination of these ways. For example, the proximity data as displayed in GUI 310 can be derived from sensor and GPS data exchanged amongst mobile client vehicles 120A-C.

The presence of obstacle 302 can be included in messages 304A and 304B and result in a textual notification displayed in display area 208B that an obstacle is present. In addition or alternatively, if mobile client vehicle 120A brakes while approaching object 302, the braking action event information can be included in messages 304A and 304B. The braking action event information can, in this example, be displayed as text in display area 208B or in the form of graphical information superimposed on graphical symbol 314. In some examples, information regarding the driver's historical behavior, e.g. the driver's route to work, can also be included in messages 304A and 304B.

In another example scenario where GUI 310 represents a display in mobile client vehicle 120C and mobile client vehicles 120A and 120B are parked vehicles, a request parking space graphical button can be provided in touch interface zone 208A. Activation of touch interface button 208A, in this example, can initiate message 306A from mobile client vehicle 120C to mobile client vehicle 120A or message 306B from mobile client vehicle 120C to mobile client vehicle 120B to inquire about parking space.

Messages 306A and 306B can be inquiries asking the drivers of vehicles 120A and 120B whether they are leaving their respective parking spaces. Alternatively, messages 306A and 306B can be inquiries to mobile client vehicles 120A and 120B to provide sensor data indicating an amount of parking space available, e.g. a distance between mobile client vehicle 120A and object 302 or a distance between mobile client vehicles 120A and 120B. In another alternative, messages 306A and 306B can be requests to mobile client vehicles 120A and 120B to move autonomously in order to create a parking space for mobile client vehicle 120C.

Figure 3C:
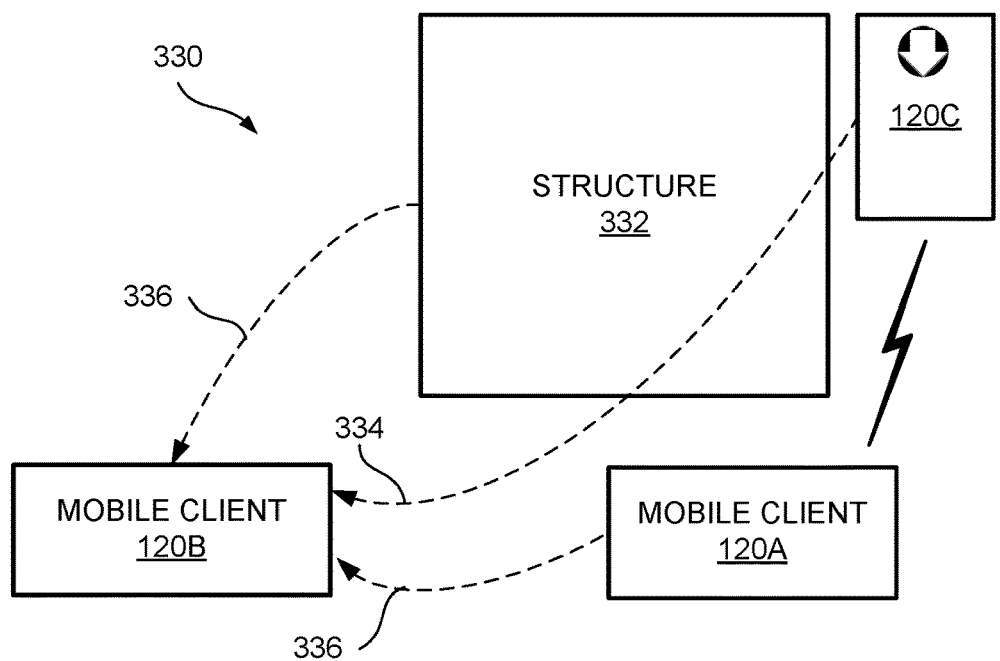
FIG. 3C is a data architecture diagram showing another illustrative example of data exchange in an application of the disclosed technology for intervehicle communication.
Figure 3D:
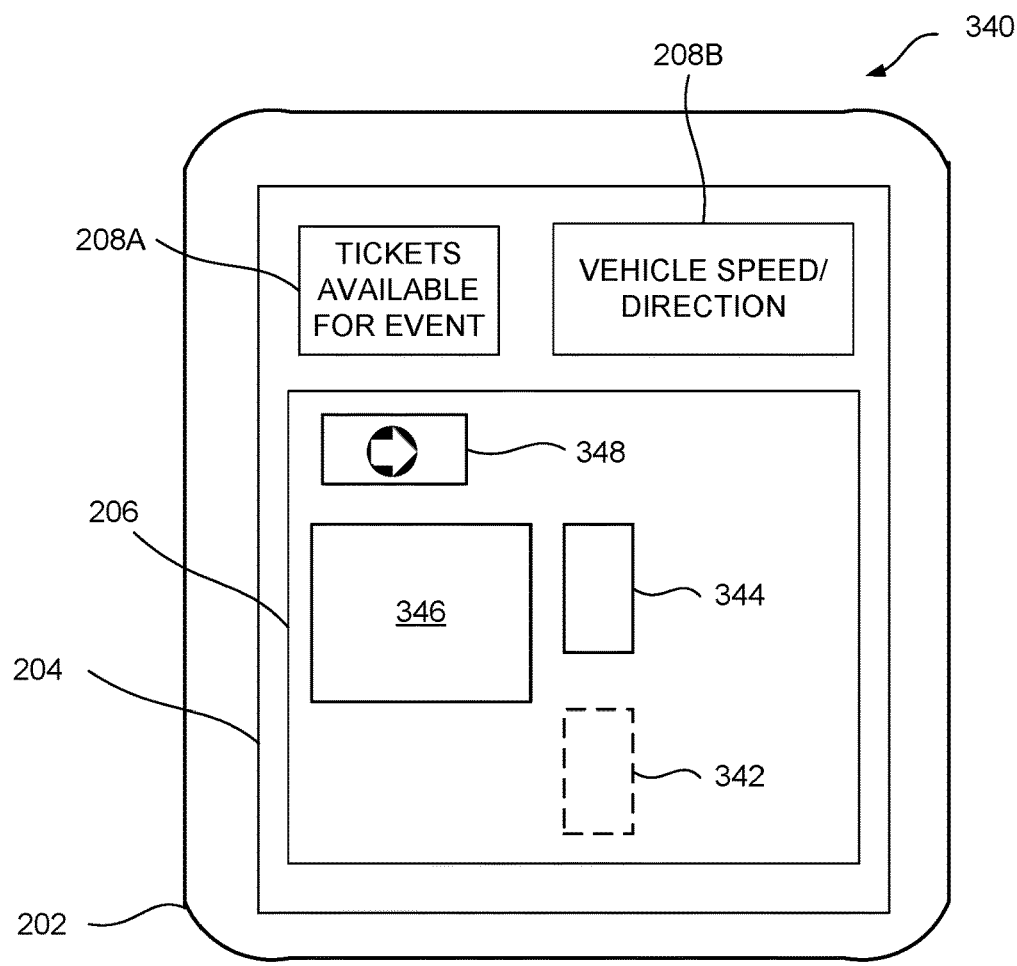
FIG. 3D is a schematic diagram illustrating an example of a graphical user interface in the application of the disclosed technology for intervehicle communication of FIG. 3C.

FIG. 3C is a data architecture diagram showing an illustrative example scenario 330 of data exchange in an application of the disclosed technology for intervehicle communication and FIG. 3D is a schematic diagram illustrating an example of a GUI 340 in mobile client vehicle 120B in the example of FIG. 3C.

In scenario 330, structure 332 can be detected using sensors in mobile clients 120A-C or using map data or a combination of sensor and map data. Mobile client vehicle 120B is represented by graphical symbol 342, mobile client vehicle 120A is represented by graphical symbol 344, and structure 332 is represented by graphical symbol 346. Sensors in mobile client vehicle 120A detect approaching mobile client vehicle 120C, which is represented by graphical symbol 348.

Note that it is unlikely that sensors in mobile client vehicle 120B can detect mobile client vehicle 120C. Information regarding mobile client vehicle 120C, e.g. sensor data, can be provided in message 336 from mobile client vehicle 120A to mobile client vehicle 120B. In addition or alternatively, mobile client vehicle 120C can provide information, e.g. speed or GPS data, in message 334 from mobile client vehicle 120C to mobile client vehicle 120B. Also, in some examples, structure 332 can provide information regarding mobile client vehicle 120C in message 336 from structure 332 to mobile client vehicle 120B, e.g. a notification that mobile client vehicle 120C is leaving a parking garage in structure 332.

In some examples, such as when mobile client 120C is within communication range of mobile client 120A, but out of communication range of mobile client 120B, mobile client 120A can relay information, such as sensor and GPS information, from mobile client device 120C to mobile client device 120B. By relaying and sharing data between mobile client devices even when they are out of range of one another, sensor data and other useful information can be obtained for display to a driver. For example, in a low visibility situation, such as driving in fog, data regarding vehicles ahead of the driver's vehicle, but out of communication range, may be obtained from other vehicles and displayed on GUI 206.

Information regarding a position, speed and direction of mobile client vehicle 120C, which can be derived, in this example, from sensor data in mobile client vehicle 120A or GPS data from mobile client vehicle 120C, can be displayed in GUI 340. In one example, vehicle speed and direction data is displayed textually in display area 208B. Alternatively, vehicle speed and direct data for mobile client vehicle 120C is superimposed on graphical symbol 348 that represents mobile client vehicle 120C, e.g. as an arrow on graphical symbol 348 indicating direction and speed.

In certain examples, structure 332 can provide event information to mobile client vehicle 120B that is displayed in display area 208A. For example, the availability of tickets for a sports or performance event at structure 332 can be displayed in 208A. In certain examples, if display area 208A is a touch activation button, then activation of display area by an occupant of mobile client vehicle 120B can initiate purchase of tickets for the event.

In other examples, advertising, promotion or similar information involving a product or service can be displayed to the driver when the vehicle is in a vicinity of a location associated with the product or service, such as structure 332. In still another example, if a driver of a first vehicle is offering an object, e.g. an on-line auction of the object, and a driver of a second vehicle has indicated an interest in the object, e.g. has submitted a bid on the object or is tracking the auction, then a notification can be displayed to one or both drivers when their vehicles are within a proximity to one another.

Figure 3E:
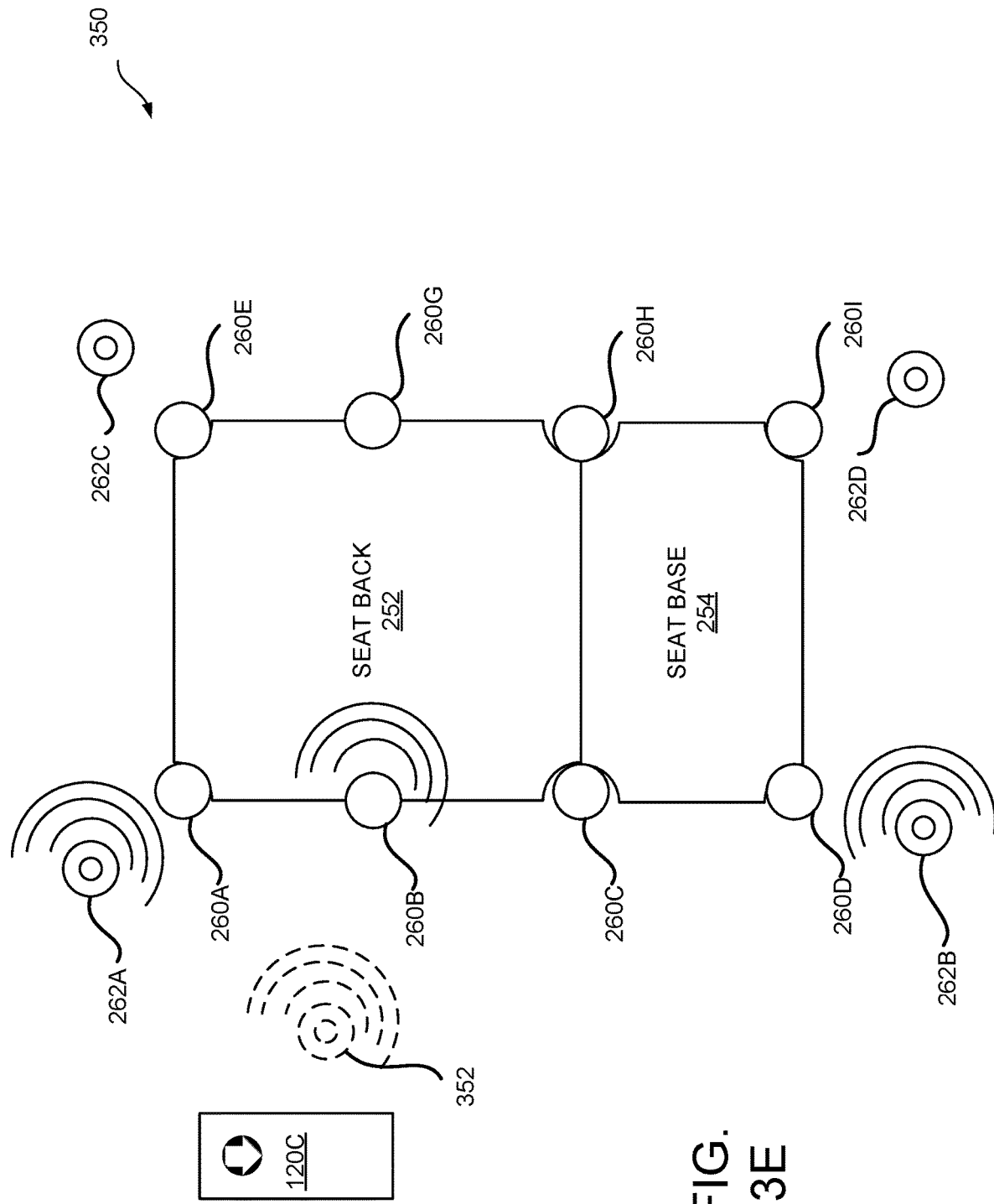
FIG. 3E is a schematic diagram illustrating an example of haptic and audio interfaces in an application of the disclosed technology for intervehicle communication.

As noted above, information regarding vehicles and objects can be provided to a driver of mobile client vehicle using a haptic or audio interface. FIG. 3E is a schematic diagram illustrating an example of a combined haptic and audio interface 350 based on the devices shown in FIG. 2B. As noted above, the haptic devices 260 or audio speakers 262 or both can be differentially driven to provide a driver with information regarding the presence and location of an object or vehicle, such as mobile client vehicle 120C.

In this example, the presence and location of mobile client vehicle 120C is signaled to the driver by activating haptic device 260B to create vibration in a location in seat back 252 corresponding to the position of mobile client vehicle 120C. As mobile client vehicle 120C moves with respect to the driver, the vibration of haptic device 260B can be decreased and the vibration of other haptic devices 260 increased to indicate the change in position. For example, if mobile client vehicle 120C is overtaking and passing the driver's vehicle, the vibration of haptic device 260B is decreased while the vibration of haptic devices 260C and 260D are increased.

Similarly, the presence and location of mobile client vehicle 120C can be signaled to the driver by differentially driving audio speakers 262. In this example, audio speakers 262A and 262B are differentially driven to output an audio signal representing mobile client vehicle 120C at a perceived position 352. The perceived position 352 can be generated due to a stereo affect created by audio speakers 262A and 262B such that the driver perceives the signal as emanating from perceived position 352. If mobile client vehicle 120C is overtaking and passing the driver's vehicle, then the audio speakers 262A and 262B are differentially driven to shift the perceived position 352 to coincide with the relative position of mobile client vehicle 120C.

Note that different haptic or audio signals can be utilized to represent different types of vehicles or objects. For example, a steady mid-range vibration or audio tone can be utilized to represent a passenger vehicle, a steady lower frequency vibration or audio tone can be utilized to represent a larger vehicle, another audio tone value can be utilized to represent a pedestrian or a bicyclist, and a pulsing high frequency vibration or audio tone utilized to represent an emergency vehicle. Also, audio signals can include a spoken message conveying information to the driver, e.g. "emergency vehicle approaching" or "bicycle approaching from the right."

Note that a variety of approaches may be utilized that remain consistent with the disclosed technology. For example, a variety of techniques can be utilized to determine the relative position and speed of objects or vehicles, such as combining sensor data from multiple vehicles or utilizing GPS data from vehicles. In addition, a variety of approaches may be utilized for displaying or outputting information to a driver, such as a combination of haptic vibration, audio output signal, and graphical text to provide notification regarding an emergency vehicle. A wide variety of approaches may be utilized that are consistent with the disclosed technology.

Figure 4A:
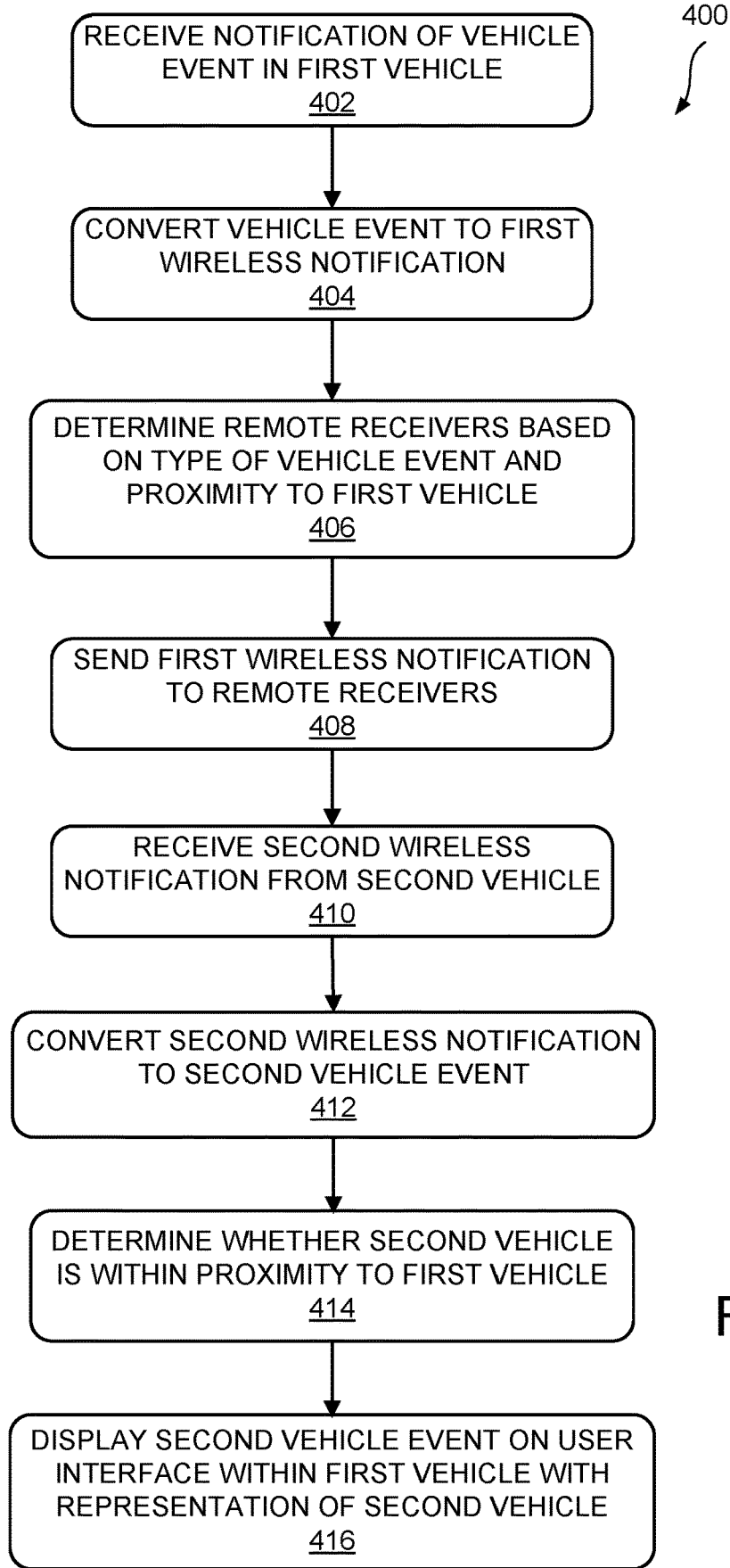
FIG. 4A is a control flow diagram showing an illustrative example of a process for intervehicle communication in accordance with the disclosed technology.

FIG. 4A is a control flow diagram showing an illustrative example of a process 400 for intervehicle communication in accordance with the disclosed technology. At 402, a notification is received of a vehicle event in a first vehicle, e.g. a braking event. At 404, the vehicle event is converted to a first wireless notification indicating the vehicle event.

At 406, an automatic determination is made of remote receivers, e.g. receivers in mobile client vehicles 120, that are within a proximity of the first vehicle and should receive the notification based on the type of notification. At 408, the first wireless notification is transmitted to the remote receivers determined to receive the notification.

The determination of the remote receivers can be made based a variety of factors, such as signal strength of a communication link with a receiver or by sensor or GPS data indicating a position of a mobile client vehicle 120. The determination can also be made based on a type of notification and the proximity can also be determined based on the type of notification. For example, a braking event is only sent to mobile client vehicles 120 within a one hundred foot radius of the first vehicle. In another example, an emergency vehicle event is sent to mobile client vehicles 120 within a one thousand foot radius of the first vehicle.

Also, the proximity can be predetermined in an implementation design, e.g. proximity is selected to be one hundred feet, or algorithmically determined, e.g. a Bayesian determination based on proximity values and accident rates.

At 410, a second wireless notification message is received from a second vehicle and, at 412, the second wireless notification message is converted to a second vehicle event. At 414, a determination is made as to whether the second vehicle is within a particular relative proximity to the first vehicle. For example, if the second vehicle event is a braking event and the second vehicle is positioned in front of the first vehicle.

At 416, the second vehicle event is displayed on a user interface within the first vehicle with a representation of the second vehicle. In some examples, the representation can be a graphical symbol on a GUI or a head-up display, as discussed above with respect to FIGS. 3A-D. Also, in some examples, the representation can be a haptic signal or an audio signal, as discussed above with respect to FIGS. 2B and 3E.

Figure 4B:
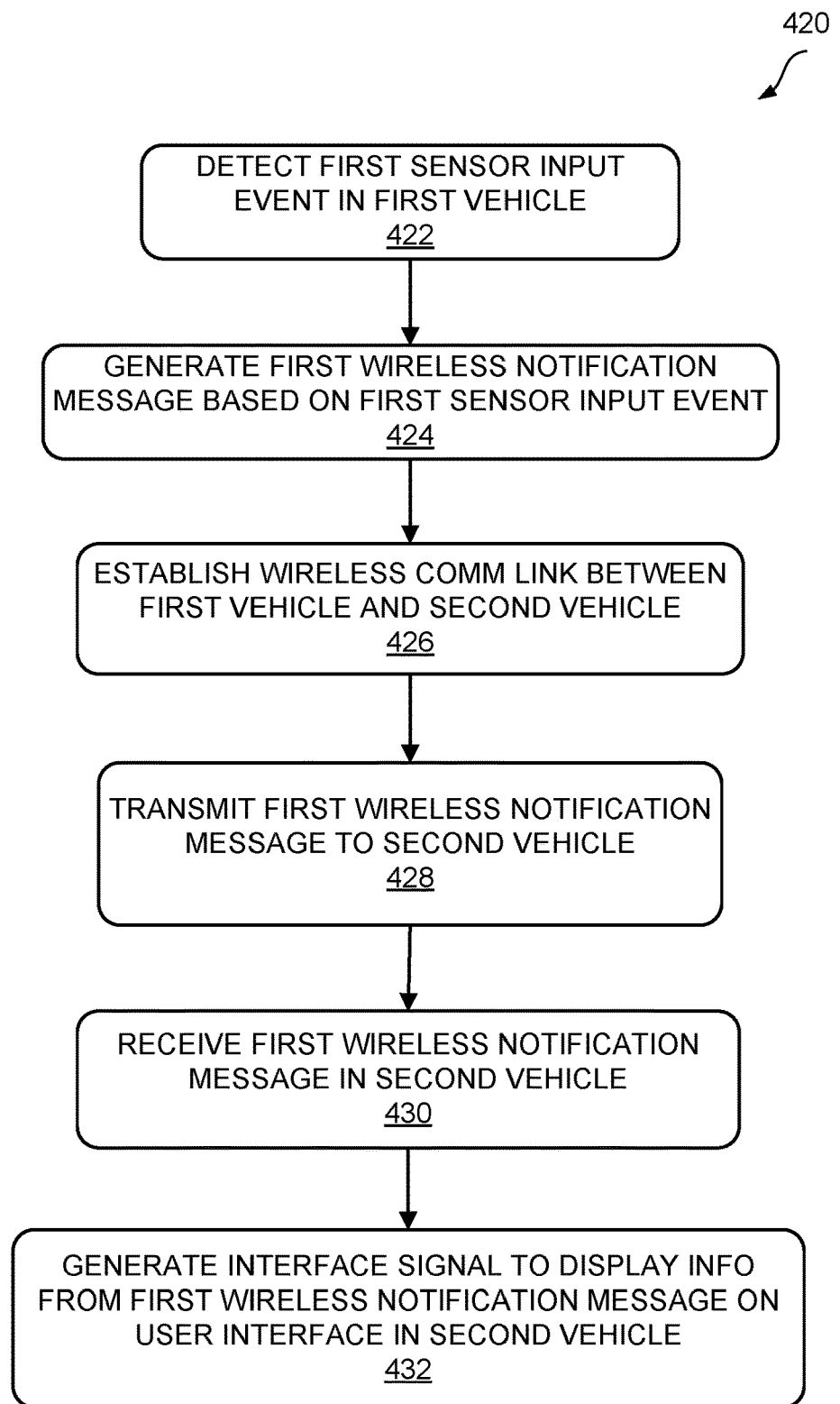
FIG. 4B is a control flow diagram showing another illustrative example of a process for intervehicle communication in accordance with the disclosed technology.

FIG. 4B is a control flow diagram showing another illustrative example of a process 420 for intervehicle communication in accordance with the disclosed technology. At 422, a first sensor input event is detected in a first vehicle. Examples of input events include a driver braking, steering or acceleration event, a door opening, detection of an object or vehicle, or detection of a user input. At 424, a first wireless notification message is generated based on the first sensor event.

At 426, a wireless communication link is established between the first vehicle and a second vehicle. For example, a WLAN device in a mobile client in the first vehicle establishes a wireless communication channel with a WLANing device in a mobile client in the second vehicle. At 428, the first wireless notification message is transmitted to the second vehicle via the wireless communication link.

At 430, the first wireless notification message is received in the second vehicle. At 432, an interface signal is generated to display information from the first wireless notification message on a user interface in the second vehicle, such as a GUI, a haptic device or an audio device.

For example, a steering event in the first vehicle is detected and sent in a wireless notification message to the second vehicle. When the wireless notification message is received in the second vehicle, a visual indication of the steering event is displayed on a GUI, a haptic device is driven to vibrate, and an audio signal is generated.

Figure 4C:
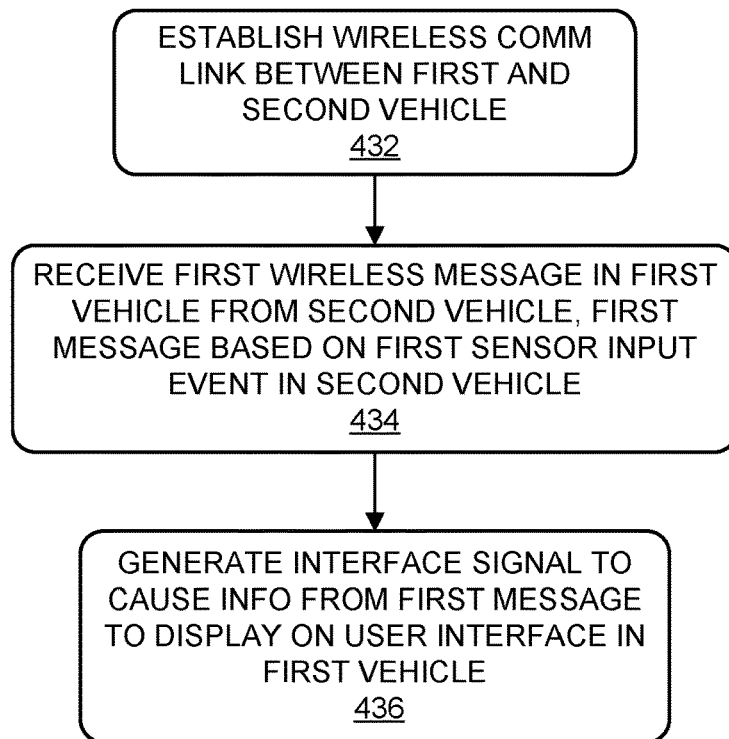
FIG. 4C is a control flow diagram illustrating an example of a process in a first vehicle for receiving an event message and generating an interface signal to display information relating to the event in accordance with the disclosed technology.

FIG. 4C is a control flow diagram illustrating an example of a process 430 in a first vehicle for receiving an event message and generating an interface signal to display information relating to the event. At 432, a wireless communication link, such as a WLAN, is established between the first vehicle and a second vehicle.

At 434, a first wireless message from the second vehicle is received in the first vehicle, where the first message is based on a first sensor input event in the second vehicle. At 436, an interface signal is generated to cause information from the first message to be displayed or output on one or more user interface devices on the first vehicle, such as a GUI, haptic device, or audio system.

Figure 4D:
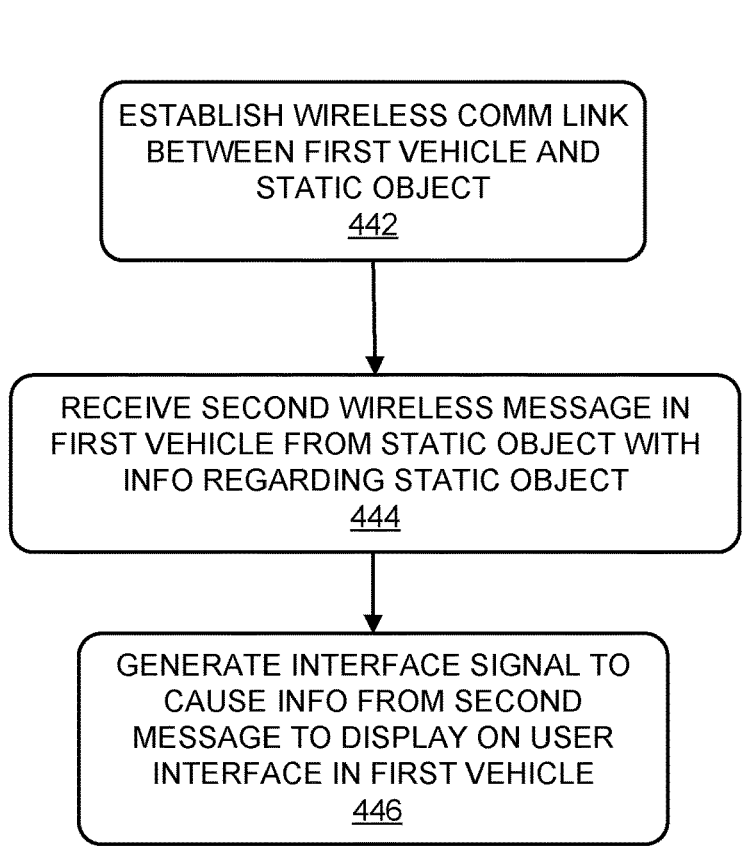
FIG. 4D is a control flow diagram illustrating an example of a process for receiving an event message from a static object and generating an interface signal to display information relating to the event in accordance with the disclosed technology.

FIG. 4D is a control flow diagram illustrating an example of a process 440 for receiving an event message from a static object, such as a building, and generating an interface signal to display information relating to the event. At 442, a wireless communication link, such as a WLAN, is established between the first vehicle and a static object, such as a sports arena, a retail store, or a traffic signal.

At 444, a first wireless message from the static object is received in the first vehicle, where the first message is based on an event relating to the static object. For example, the event message relates to tickets available for an upcoming game at the sports arena. In another example, the event message relates to a vehicle leaving a parking garage in the store. In still another example, the event message relates to the traffic signal changing to a red light.

At 446, an interface signal is generated to cause information from the event message to be displayed or output on one or more user interface devices on the first vehicle, such as a GUI, haptic device, or audio system. For example, a vehicle leaving the parking garage of the store causes a notification to be displayed on a GUI, a vibration to be generated in a driver seat or steering wheel, and an audio message being output advising of a vehicle entering the street from the building.

Figure 4E:
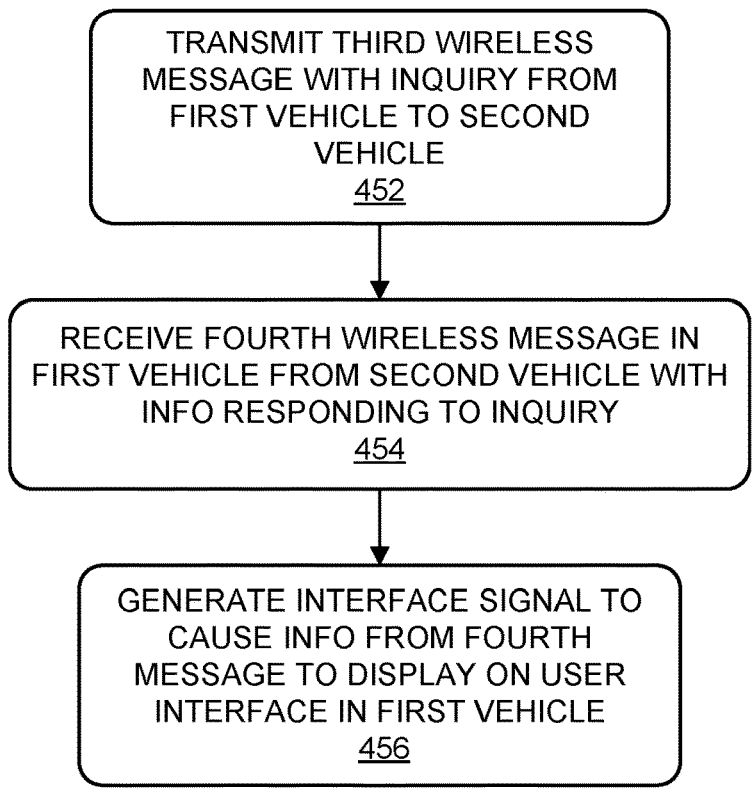
FIG. 4E is a control flow diagram illustrating an example of a process 450 for sending an inquiry from one vehicle to another and receiving and displaying a response to the inquiry in accordance with the disclosed technology.

FIG. 4E is a control flow diagram illustrating an example of a process 450 for sending an inquiry from one vehicle to another and receiving and displaying a response to the inquiry. At 452, a wireless message with an inquiry is transmitted from a first vehicle to a second vehicle using a wireless communication link. One example of an inquiry is asking whether a driver of the second vehicle is vacating a parking spot. Another example of an inquiry is requesting information from the second vehicle's sensors regarding an amount of space between the second vehicle and a third vehicle or static object.

At 454, the first vehicle receives a responsive wireless message message from the second vehicle with information pertaining to the inquiry. For example, the driver of the second vehicle indicates that they are leaving the parking space shortly. In another example, the responsive message includes information on the distance between the second vehicle and the third vehicle or stationary object. At 456, an interface signal is generated to cause the information from the responsive message to be displayed on a user interface device in the first vehicle. For example, the reply from the driver of the second vehicle can be displayed on a GUI are stated audibly using an audio system. In another example, the distance between the second vehicle and the third vehicle is displayed on the GUI with an indication as to whether the first vehicle can fit in the available space.

Figure 4F:
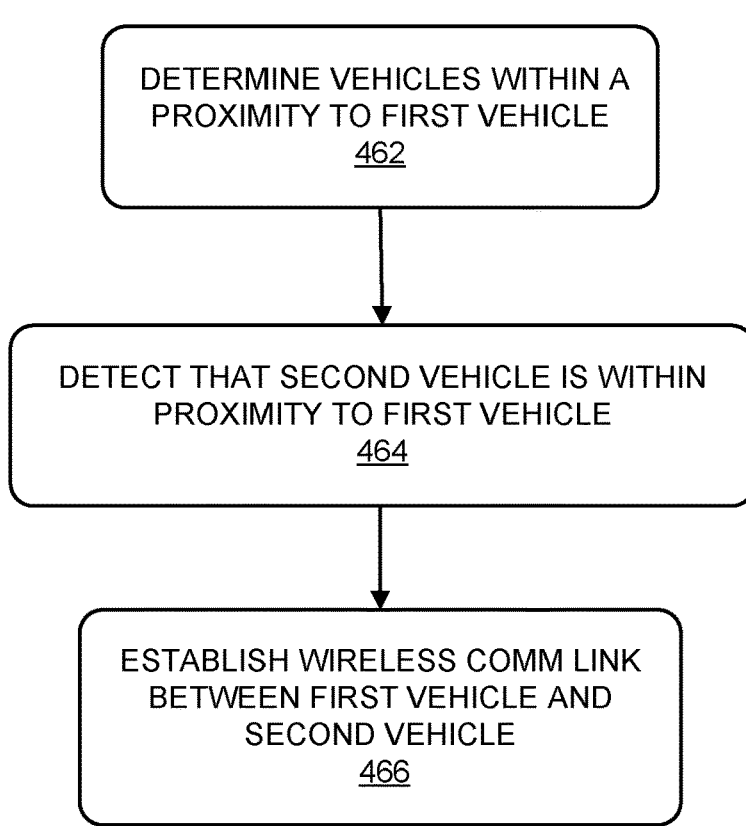
FIG. 4F is a control flow diagram illustrating an example of a process for determining vehicles in nearby proximity and establishing a wireless communication link with a nearby vehicle.

FIG. 4F is a control flow diagram illustrating an example of a process 460 for determining vehicles in nearby proximity and establishing a wireless communication link with a nearby vehicle. At 462, the vehicles within a proximity to a first vehicle are determined. For example, a WLAN device in the first vehicle identifies all the WLAN devices in other vehicles within its transmission range.

At 464, a second vehicle is detected that is within a proximity to the first vehicle. For example, the WLAN device in the second vehicle was identified as one of the devices within the transmission range of the WLAN device of the first vehicle. At 466, a wireless communication link is established between the first and second vehicles. For example, a peer-to-peer or ad hoc connection is established between the WLAN device of the first vehicle and the WLAN device of the second vehicle. Messages and sensor data can then be exchanged between the vehicles using the wireless communication link.

It should be appreciated that a variety of different instrumentalities and methodologies can be utilized to establish wireless communication as well as collect, exchange and display sensor and message data without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to intervehicle communication. The specific examples of different aspects of intervehicle communication described herein are illustrative and are not intended to limit the scope of the techniques shown.

Computer Architectures for Intervehicle Communication

Figure 6:
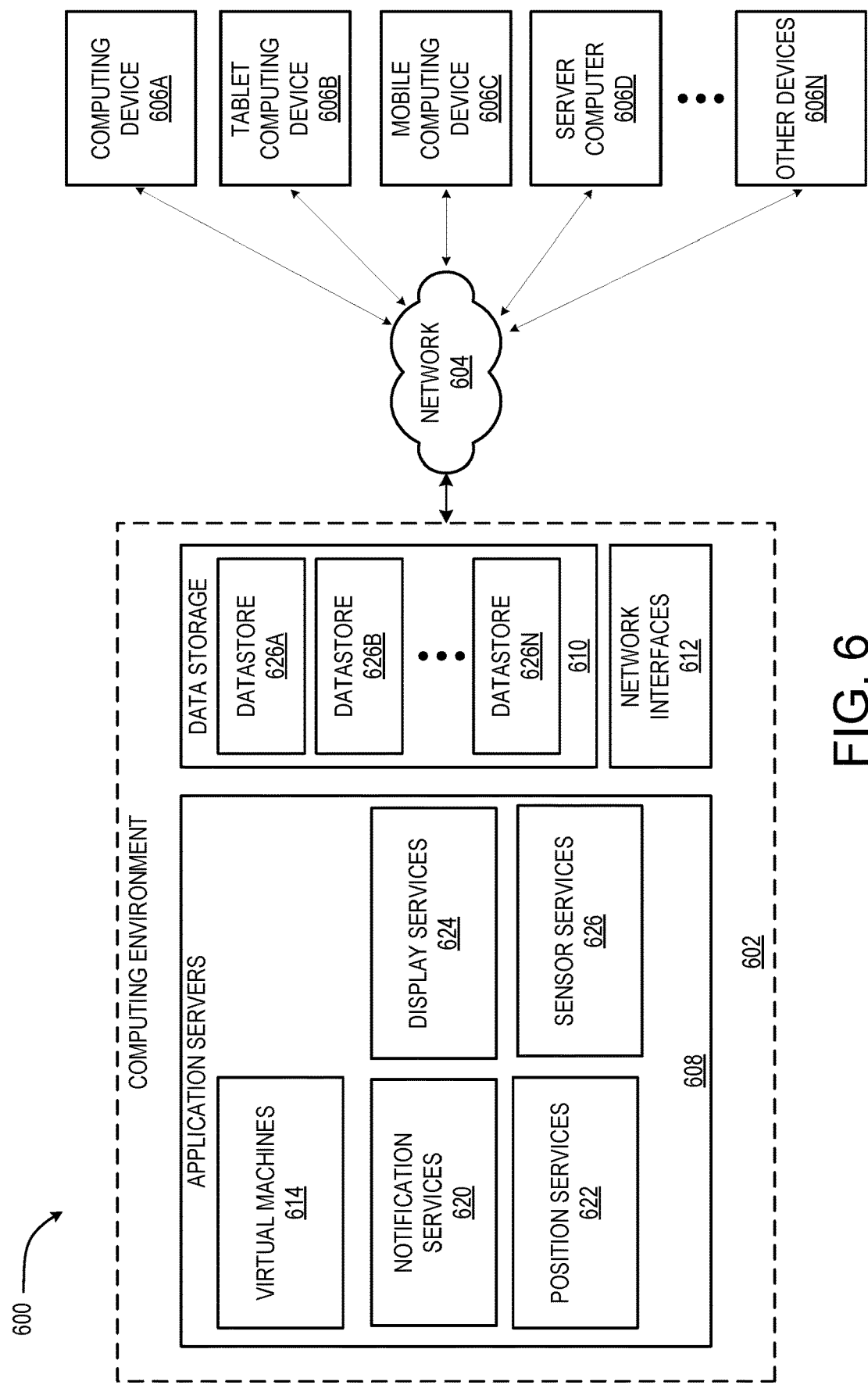
FIG. 6 is a diagram illustrating a distributed computing environment capable of implementing aspects of the techniques and technologies presented herein.

Note that at least parts of processes 400, 420, 430, 440, 450, and 460 of FIGS. 4A, 4B, 4C, 4D, 4E and 4F and other processes and operations pertaining to intervehicle communication described herein may be implemented in one or more servers, such as computer environment 600 in FIG. 6, or the cloud, and data defining the results of user control input signals translated or interpreted as discussed herein may be communicated to a user device for display. Alternatively, the intervehicle communication processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof As described herein, in conjunction with the FIGURES described herein, the operations of the routines (e.g. processes 400, 420, 430, 440, 450, and 460 of FIGS. 4A, 4B, 4C, 4D, 4E and 4F) are described herein as being implemented, at least in part, by an application, component, and/or circuit. Although the following illustration refers to the components of FIGS. 4A-F, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programming interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 430, 440, 450, and 460 of FIGS. 4A, 4B, 4C, 4D, 4E and 4F) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
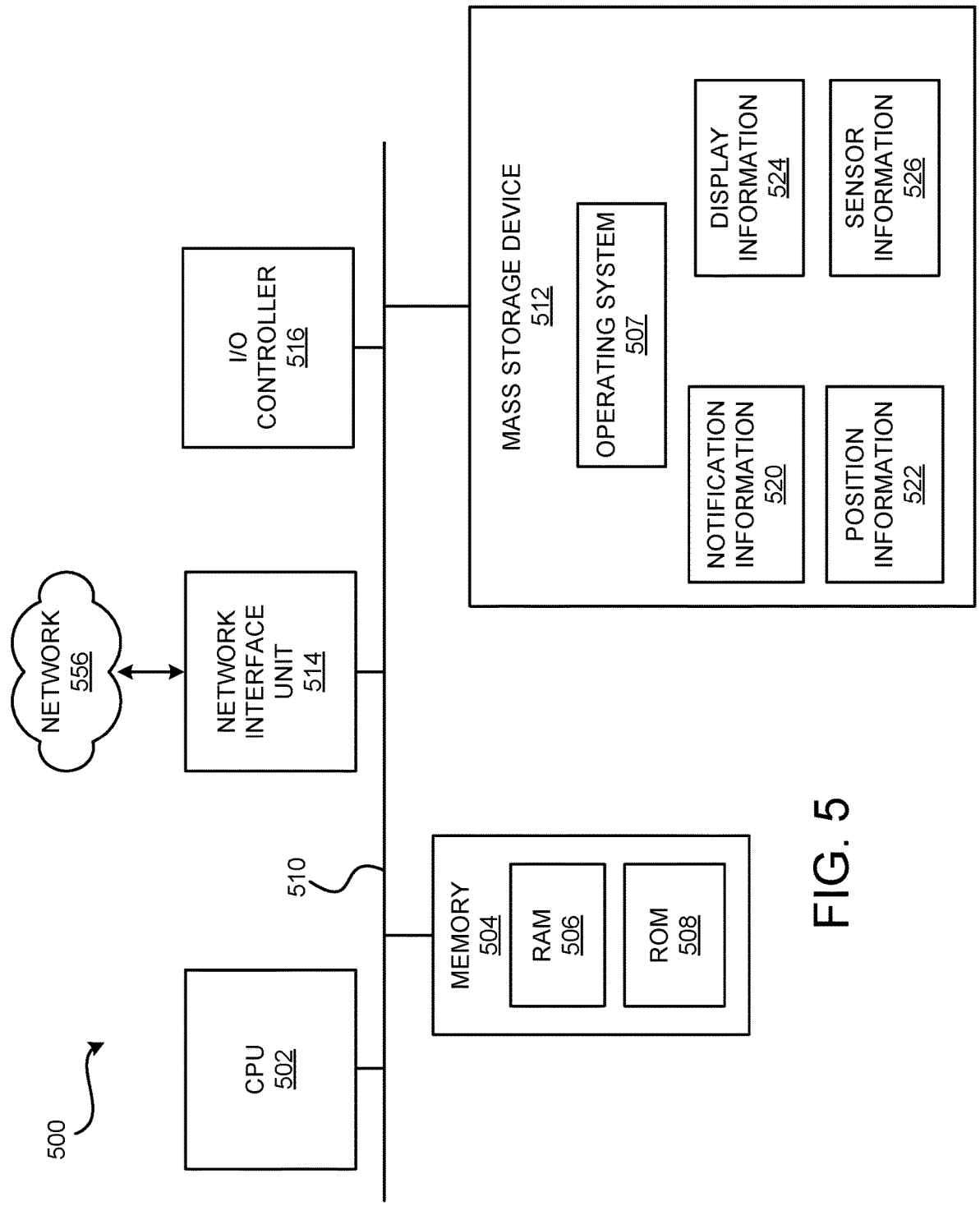
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110 and 120A-C(FIGS. 1A, 3A and 3C), capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as notification information 520, position information 522, display information 524 and sensor information 526), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for intervehicle communication. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for intervehicle communication. It should be understood that this configuration is illustrative only and should not be construed as being limiting in any way.

According to various implementations, the application servers 608 also include one or more notification services 620, position services 622, display services 624 and sensor services 626. The notification services 620 can include services for managing notifications sent to mobile client vehicles. The position services 622 can include services for collecting and distributing position data regarding mobile client vehicles, such as map, GPS or sensor based data. The display services 624 can include services for managing data sent for display in mobile client vehicles. The sensor services 626 can includes services for collecting and distributing sensor data from multiple mobile client vehicles.

As shown in FIG. 6, the application servers 608 also can host other services, applications, portals, and/or other resources ("other resources") 624. The other resources 624 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for a intervehicle communication. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for intervehicle communication, among other aspects.

Figure 7:
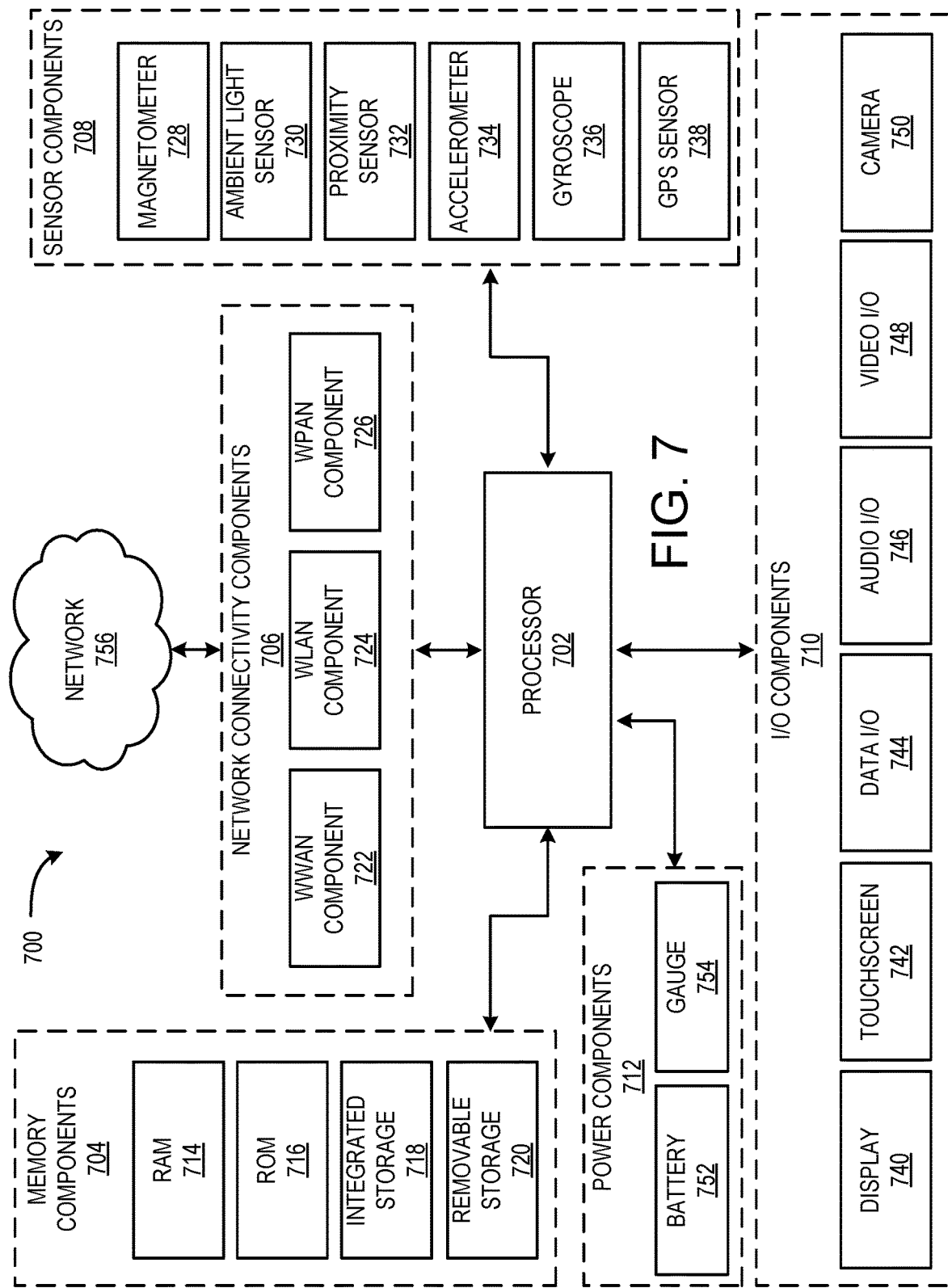
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for intervehicle communication. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the file owner device 110 and client/servers 120A-C shown in FIG. 1 and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual- multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented vehicle communication method, the method comprising: receiving a notification of a first vehicle event within a first vehicle; converting the first vehicle event into a first wireless notification; automatically determining one or more remote receiving devices to receive the first wireless notification based on a type of the first vehicle event and proximity of the one or more remote receiving devices to the first vehicle; sending the first wireless notification to the one or more remote receiving devices; receiving a second wireless notification from another device located in a second vehicle; converting the second wireless notification to a second vehicle event; automatically determining the second vehicle is within a proximity to the first vehicle; and displaying a representation of the second vehicle event on a user interface within the first vehicle.

Clause 2. The method of Clause 1, wherein the second wireless notification indicates at least one of a position, distance, speed or direction of the second vehicle.

Clause 3. The method of Clause 1, wherein automatically determining one or more remote receiving devices to receive the first wireless notification based on a type of the vehicle event and proximity of the one or more remote receiving devices to the first vehicle further comprises determining a strength of network signal between the first vehicle and the second vehicle.

Clause 4. The method of Clause 1, wherein automatically determining one or more remote receiving devices to receive the first wireless notification based on a type of the vehicle event and proximity of the one or more remote receiving devices to the first vehicle further comprises receiving at least one of an ultrasonic sensor result or a lidar sensor result.

Clause 5. The method of Clause 1, wherein the second wireless notification includes a request for information by the first vehicle to the second vehicle.

Clause 6. The method of Clause 7, wherein the request for information includes a request for information about a location recently visited by the second vehicle.

Clause 7. A computer-implemented vehicle communication method, the method comprising: detecting a first sensor input event in a first vehicle; generating a first wireless notification message based on the first sensor input event; establishing a wireless communication link between the first vehicle and a second vehicle; and transmitting the first wireless notification message from the first vehicle to the second vehicle.

Clause 8. The method of Clause 7, the method including: receiving the first wireless notification message in the second vehicle; and generating an interface signal based on the first wireless notification message that is configured to cause information from the first wireless notification message to be displayed on a user interface of the second vehicle.

Clause 9. The method of Clause 8, wherein: the first sensor input event comprises at least one of a braking action, a steering action, an acceleration action, a door opening action, and a potential action relating to a historical driving pattern; and the signal configured to cause the information to be displayed on the user interface of the second vehicle comprises information corresponding to at least one of the braking action, the steering action, the acceleration action, the door opening action, or a potential action relating to the historical driving pattern.

Clause 10. The method of Clause 7, where the step of establishing a wireless communication link between the first vehicle and a second vehicle comprises: automatically determining one or more vehicle communication devices within a proximity to the first vehicle; detecting that a vehicle communication device of the second vehicle is within the proximity to the first vehicle; and establishing the communication link between the vehicle communication device of the first vehicle and the vehicle communication device of the second vehicle.

Clause 11. The method of Clause 7, where the step of establishing a wireless communication link between the first vehicle and a second vehicle includes: determining a strength of network signal between the first vehicle and the second vehicle.

Clause 12. The method of Clause 7, where the first wireless notification message includes information regarding at least one of a position, speed, and direction of the first vehicle.

Clause 13. The method of Clause 7, where the first wireless notification message includes information from one or more sensors in the first vehicle regarding at least one of a third vehicle and an object.

Clause 14. The method of Clause 13, where the information from one or more sensors in the first vehicle in the first wireless notification message includes information regarding at least one of a distance, position, speed, and direction of the third vehicle or the object.

Clause 15. A vehicle communication system, the system comprising: one or more processors; and at least one computer storage medium having computer executable instructions stored thereon which, when executed by the one or more processors, cause the one or more processors to: establish a wireless communication link between a first vehicle and a second vehicle; receive a first wireless message in the first vehicle from the second vehicle, where the first wireless message is based on a first sensor input event in the second vehicle; and generate an interface signal with information based on the first wireless message that is configured to cause the information to be displayed by a user interface of the first vehicle.

Clause 16. The vehicle communication system of Clause 15, wherein: the first sensor input event comprises at least one of a braking action, a steering action, an acceleration action, a door opening action, a potential action relating to a historical driving pattern, and a position, direction or speed of a third vehicle; and the signal configured to cause the information to be displayed on the user interface of the first vehicle comprises information corresponding to at least one of the braking action, the steering action, the acceleration action, the door opening action, the potential action relating to the historical driving pattern, and the position, direction or speed of the third vehicle.

Clause 17. The vehicle communication system of Clause 15, where the system is further configured to: establish a wireless communication link between the first vehicle and a static object; receive a second wireless message in the first vehicle from the static object, the second wireless message including information regarding the static object; and generate an interface signal with the information in the second wireless message that is configured to cause the information in the second wireless message to be displayed by a user interface of the first vehicle.

Clause 18. The vehicle communication system of Clause 17, where the information in the second wireless message regarding the static object comprises at least one of event information for an event to be held at the static object, historical information regarding the static object, notification that a vehicle or person is entering or exiting the static object, and information regarding status, goods or services at the static object.

Clause 19. The vehicle communication system of Clause 17, where the is further configured to: transmit a third wireless message from the first vehicle to the second vehicle, where the third wireless message includes an inquiry regarding space available for parking; receive a fourth wireless message in the first vehicle from the second vehicle, where the fourth wireless message includes information regarding the space available for parking; and generate an interface signal with the information in the fourth wireless message that is configured to cause the information regarding the space available for parking in the fourth wireless message to be displayed by a user interface of the first vehicle.

Clause 20. The vehicle communication system of Clause 15, where the operation to establish a wireless communication link between the first vehicle and a second vehicle comprises: automatically determining one or more vehicle communication devices within a proximity to the first vehicle; detecting that a vehicle communication device of the second vehicle is within the proximity to the first vehicle; and establishing the communication link between the vehicle communication device of the first vehicle and the vehicle communication device of the second vehicle.

What is claimed is:

1. A computer-implemented vehicle communication method, the method comprising:
    receiving a notification of a first vehicle proximity sensor event within a first vehicle;
    converting the first vehicle proximity sensor event into a first wireless notification;
    automatically determining one or more remote receiving devices to receive the first wireless notification based on a type of the first vehicle proximity sensor event and proximity of the one or more remote receiving devices to the first vehicle;
    sending the first wireless notification to the one or more remote receiving devices;
    receiving a second wireless notification from another device located in a second vehicle, the second wireless notification corresponding to a second vehicle proximity sensor event within the second vehicle, where the second wireless notification is received directly in the first vehicle from the second vehicle and includes information regarding a relative position of the second vehicle proximity sensor event to the second vehicle;
    automatically determining the second vehicle is within a proximity to the first vehicle;
    converting the second wireless notification to a representation of the second vehicle event that includes the information regarding the relative position of the second vehicle proximity sensor event to the second vehicle; and
    graphically displaying the representation of the second vehicle event on a user interface within the first vehicle.

2. The method of claim 1, wherein information regarding the relative position of the second vehicle proximity sensor event to the second vehicle indicates at least one of a position, distance, speed or direction of a third vehicle or object relative to the second vehicle based on data from one or more proximity sensors in the second vehicle.

3. The method of claim 1, wherein automatically determining one or more remote receiving devices to receive the first wireless notification based on a type of the vehicle event and proximity of the one or more remote receiving devices to the first vehicle further comprises determining a strength of network signal between the first vehicle and the second vehicle.

4. The method of claim 1, wherein automatically determining one or more remote receiving devices to receive the first wireless notification based on a type of the vehicle event and proximity of the one or more remote receiving devices to the first vehicle further comprises receiving at least one of an ultrasonic sensor result or a lidar sensor result.

5. A computer-implemented vehicle communication method, the method comprising:

detecting a first proximity sensor input event in a first vehicle;
generating a first wireless notification message based on the first proximity sensor input event;
automatically determining one or more vehicle communication devices within a proximity to the first vehicle;
detecting that a vehicle communication device of the second vehicle is within the proximity to the first vehicle by:
  determining a strength of network signal between the first vehicle and the second vehicle, and
  determining that the vehicle communication device of the second vehicle is within the proximity to the first vehicle if the strength of network signal exceeds a threshold level;
establishing a communication link between the vehicle communication device of the first vehicle and the vehicle communication device of the second vehicle; and
transmitting the first wireless notification message from the first vehicle to the second vehicle.

6. The method of claim 5, the method including:
receiving the first wireless notification message in the second vehicle; and
generating an interface signal based on the first wireless notification message that is configured to cause information from the first wireless notification message to be graphically displayed on a user interface of the second vehicle.

7. The method of claim 6, wherein:
the first proximity sensor input event comprises at least one of a radar sensor event, a LIDAR sensor event, and an optical sensor event; and
the signal configured to cause the information to be displayed on the user interface of the second vehicle comprises information corresponding to at least one of the radar sensor event, the LIDAR sensor event, and the optical sensor event.

8. The method of claim 5, where the first wireless notification message further includes information regarding at least one of a position, speed, and direction of the first vehicle.

9. The method of claim 5, where the first wireless notification message includes information from one or more proximity sensors in the first vehicle regarding at least one of a third vehicle and an object.

10. The method of claim 9, where the information from one or more proximity sensors in the first vehicle in the first wireless notification message includes information regarding at least one of a distance, position, speed, and direction of the third vehicle or the object.

11. A vehicle communication system, the system comprising:
one or more processors; and
at least one computer storage medium having computer executable instructions stored thereon which, when executed by the one or more processors, cause the one or more processors to:
  establish a wireless communication link between a first vehicle and a second vehicle by:
    automatically determining one or more vehicle communication devices within a proximity to the first vehicle;
    detecting that a vehicle communication device of the second vehicle is within the proximity to the first based on a communication signal strength relating to each of the one or more vehicle communication devices; and
    establishing the communication link between the vehicle communication device of the first vehicle and the vehicle communication device of the second if the vehicle communication device of the second vehicle is within the proximity to the first vehicle;
  receive a first wireless message in the first vehicle from the second vehicle, where the first wireless message is based on a first proximity sensor input event in the second vehicle; and
  generate an interface signal with information based on the first wireless message that is configured to cause the information to be displayed by a user interface of the first vehicle.

12. The vehicle communication system of claim 11, wherein:
the first proximity sensor input event comprises at least one of a radar sensor event, a LIDAR sensor event, and an optical sensor event; and
the signal configured to cause the information to be displayed on the user interface of the first vehicle comprises information corresponding to at least one of the radar sensor event, the LIDAR sensor event, and the optical sensor event.

13. The vehicle communication system of claim 11, where the system is further configured to:
establish a wireless communication link between the first vehicle and a static object;
receive a second wireless message in the first vehicle from the static object, the second wireless message including information regarding the static object; and
generate an interface signal with the information in the second wireless message that is configured to cause the information in the second wireless message to be displayed by a user interface of the first vehicle.

14. The vehicle communication system of claim 13, where:
the information in the second wireless message regarding the static object comprises ticket availability information for an event to be held at the static object; and
the interface signal with the information in the second wireless message that is configured to cause the information in the second wireless message to be displayed by a user interface of the first vehicle is further configured to provide a touch activation button to initiate purchase of at least one ticket to the event.

15. The vehicle communication system of claim 11, where the system is further configured to:
transmit a third wireless message from the first vehicle to the second vehicle, where the third wireless message includes an inquiry regarding a first proximity sensor measurement of space available for parking;
receive a fourth wireless message in the first vehicle from the second vehicle, where the fourth wireless message includes the first proximity sensor measurement of the space available for parking; and
generate an interface signal with the information in the fourth wireless message that is configured to cause the first proximity sensor measurement of the space available for parking in the fourth wireless message to be displayed by a user interface of the first vehicle.

16. The vehicle communication system of claim 11, where the system is further configured to:
transmit a second wireless message from the first vehicle to the second vehicle, where the second wireless message includes a request for the second vehicle to move to increase space available for parking.

17. The vehicle communication system of claim 16, where the system is further configured to:

transmit a third wireless message from the first vehicle to the third vehicle, where the third wireless message includes a request for a third vehicle to autonomously move to increase space available for parking.

\* \* \* \* \*